March 12, 1957 M. L. KENNEDY 2,784,889
RECEPTACLE HOLDER FOR USE ON AUTOMOBILE SEATS
Filed Feb. 18, 1955
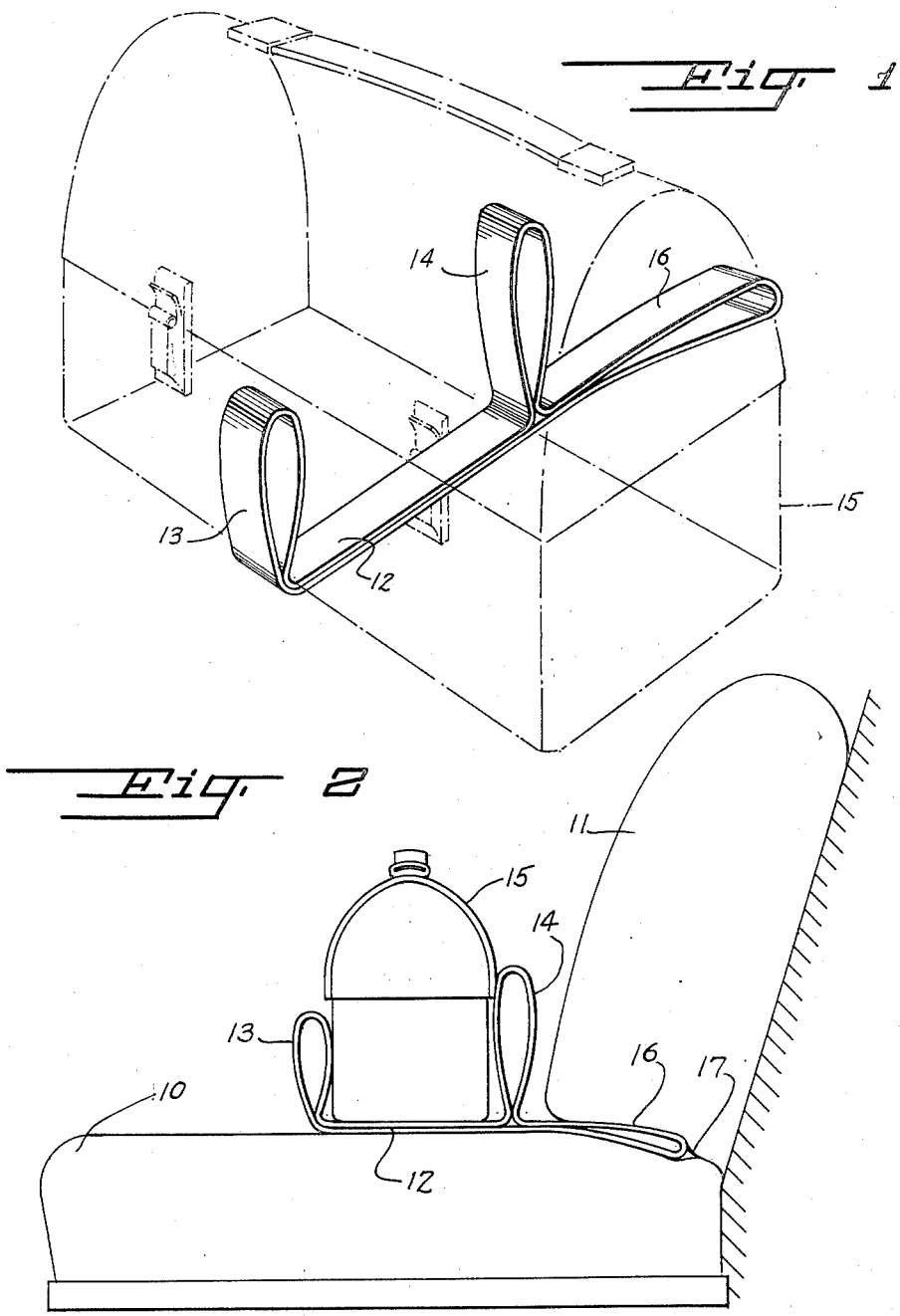
INVENTOR.
Michael L. Kennedy
BY
McMorrow, Berman & Davidson
Attorneys

United States Patent Office 2,784,889
Patented Mar. 12, 1957

2,784,889

RECEPTACLE HOLDER FOR USE ON AUTOMOBILE SEATS

Michael L. Kennedy, Denver, Colo.

Application February 18, 1955, Serial No. 489,195

3 Claims. (Cl. 224—42.45)

This invention relates to holders for lunch boxes and other receptacles for use on automobile seats.

The principal object of the present invention is to provide a holder for a lunch box or other receptacle for detachably securing it on a seat cushion of an automobile in upright condition with a portion of the holder frictionally engaged between the seat cushion and the back cushion.

Another object of the present invention is to provide a device for holding an upright receptacle such as a lunch box on an automobile seat without danger of it upsetting or sliding from the seat when the automobile makes a turn or comes to a stop.

A further object of the present invention is to provide a holder for an upright receptacle such as a lunch box for use on automobile seats which is of sturdy construction, economically and easily manufactured, and one which is highly effective in action and usable on any automobile seat having a seat cushion and a back cushion constructed separately and having the back cushion resting upon a portion of the seat cushion.

These and other objects and advantages of the present invention will be fully apparent from the following description when taken in connection with the annexed drawings, in which:

Figure 1 is an isometric view of the present invention showing in dotted lines a lunch box supported thereon.

Figure 2 is an end view showing the holder of the present invention having a portion inserted between the seat cushion and the back cushion and showing it supporting an upright lunch box.

Referring in greater detail to the drawings in which like numerals indicate like parts in the two views, the present invention consists of a holder for a lunch box or other receptacle for use on an automobile seat having a seat cushion 10 and a back cushion 11, the latter having a lower end portion contacting an adjacent end portion of the seat cushion 10.

The holder of the present invention comprises a base 12 adapted to rest upon the portion of the seat cushion 10 forwardly of the back cushion 11 and provided with a pair of resilient posts 13 and 14 rising from the base 12. The posts 13 and 14 are spaced from each other and are adapted to resiliently engage the adjacent sides of a receptacle such as a lunch box shown in dotted lines in Figure 1 and indicated by the reference numeral 15.

A resilient extension 16 projects longitudinally from one end of the base 12 and is adapted to be received between and to frictionally engage the lower end portion 17 of the back cushion 11 and the adjacent portion of the seat cushion 10.

Each of the posts 13 and 14 embody somewhat flattened closed loops extending vertically so as to hold the receptacle or lunch box 15 in an upright position with its bottom resting upon the base 12.

The extension 16 is also formed from a somewhat flattened but resilient closed loop having each of its sides frictionally engaging the adjacent portions of the seat cushion 10 and the back cushion 11.

The holder of the present invention is preferably formed from a resilient material such as soft strap steel or brass formed in a continuous and closed circle with the loops or posts 13 and 14 extending vertically and the extension 16 extending somewhat horizontally. The holder may also be constructed of a resilient plastic strip if desired.

In use, the holder may be of such a size as to be conveniently carried within the glove compartment of an automobile when not in use and may be instantly clipped to the vertical sides of a receptacle such as a lunch box and as instantly engaged between the seat cushion and the back cushion with the extension inserted therein.

What is claimed is:

1. For use with an automobile having a seat cushion and a back cushion having the lower end portion contacting an adjacent end portion of the seat cushion, a holder for supporting a receptacle in upright position, said holder having a base adapted to rest upon the portion of said seat cushion forwardly of the back cushion, a pair of resilient spaced posts rising from said base adapted to engage adjacent sides of a receptacle when supported upon said base, and an extension projecting longitudinally from one end of said base and adapted to be received between and to frictionally engage said lower end portion of the back cushion and said adjacent portion of said seat cushion.

2. For use with an automobile having a seat cushion and a back cushion having the lower end portion contacting an adjacent end portion of the seat cushion, a holder for supporting a receptacle in upright position, said holder having a base adapted to rest upon the portion of said seat cushion forwardly of the back cushion, a pair of resilient spaced posts rising from said base adapted to engage adjacent sides of a receptacle when supported upon said base, and an extension embodying a resilient closed loop projecting longitudinally from one end of said base and adapted to be received between and to frictionally engage said lower end portion of the back cushion and said adjacent portion of the seat cushion.

3. For use with an automobile having a seat cushion and a back cushion having the lower end portion contacting an adjacent end portion of the seat cushion, a holder for supporting a receptacle in upright position, said holder having a base adapted to rest upon the portion of said seat cushion forwardly of the back cushion, a pair of posts embodying resilient closed loops rising from said base adapted to engage adjacent sides of a receptacle and supported upon said base, and a resilient extension embodying a closed loop projecting longitudinally from one end of said base and adapted to be received between and to frictionally engage said lower end portion of the back cushion and said adjacent portion of the seat cushion.

References Cited in the file of this patent

UNITED STATES PATENTS

| | | |
|---|---|---|
| 1,049,803 | Boyer | Jan. 7, 1913 |
| 2,530,307 | Leach | Nov. 14, 1950 |
| 2,580,985 | Wooden | Jan. 1, 1952 |
| 2,640,595 | Byford | June 2, 1953 |